United States Patent [19]

Wells et al.

[11] Patent Number: 4,967,606

[45] Date of Patent: Nov. 6, 1990

[54] METHOD AND APPARATUS FOR PIPETTING LIQUIDS

[75] Inventors: John R. Wells, Galveston, Tex.; Robert Caveney, Los Gatos, Calif.

[73] Assignee: Caveo Scientific Instruments, Inc., Sunnyvale, Calif.

[21] Appl. No.: 188,476

[22] Filed: Apr. 29, 1988

[51] Int. Cl.[5] .......................... B01L 3/02; G01N 1/14

[52] U.S. Cl. .............................. 73/864.18; 73/864.17; 436/180

[58] Field of Search ........... 73/864.16, 864.12, 864.18; 436/180

[56] References Cited

U.S. PATENT DOCUMENTS

| | | | |
|---|---|---|---|
| 3,963,151 | 6/1976 | North, Jr. | 251/9 X |
| 4,346,742 | 8/1982 | Chase et al. | 73/864.16 X |
| 4,475,666 | 10/1984 | Bilbreg et al. | 73/864.16 X |
| 4,478,094 | 10/1984 | Salomaa et al. | 73/863.32 |
| 4,517,850 | 5/1985 | Wiseman et al. | 73/864.01 |
| 4,586,546 | 5/1986 | Mezei et al. | 73/864.24 X |
| 4,598,840 | 7/1986 | Burg | 73/864.16 X |
| 4,763,533 | 8/1988 | Rainin et al. | 73/864.16 X |

FOREIGN PATENT DOCUMENTS

| | | |
|---|---|---|
| 52355 | 5/1982 | European Pat. Off. . |
| 199466 | 10/1986 | European Pat. Off. . |
| 253685 | 1/1988 | European Pat. Off. . |
| 189560 | 11/1983 | Japan . |
| 10193 | 11/1989 | PCT Int'l Appl. . |

OTHER PUBLICATIONS

*Patent Abstracts of Japan;* ABS Grp. No. P254; ABS vol. No.: vol. 8, No. 33; ABS Pub Date: Feb. 14, 1984; (English Language Abstract of Japanese Patent Document 58-189560 cited above).

*Primary Examiner*—Tom Noland

*Attorney, Agent, or Firm*—Donald G. Lewis

[57] ABSTRACT

An improved method for pipetting multiple aliquots of liquid employs a preliminary back sip prior the first expression of an aliquot of the liquid; an adjustable back sip between each expression of aliquots of liquid; and a blow out volume of air, aspirated into the pipette prior to the initial aspiration of liquid, for blowing out residual liquid after the expression of the last aliquot of liquid. The improved method for pipetting liquid may be performed on an improve apparatus which includes a microprocessor having within its memory a schedule or correlation for the optimal back sip to execute after the expression of any given aliquot. The microprocessor may also include means for driving the apparatus so as to perform the preliminary back sip and the aspiration of the blow out volume.

5 Claims, 4 Drawing Sheets

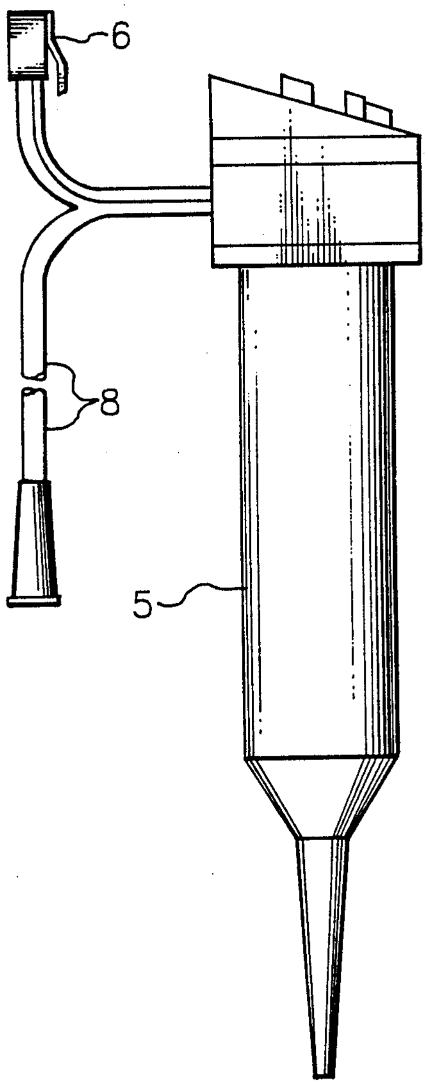
Fig.6.a.
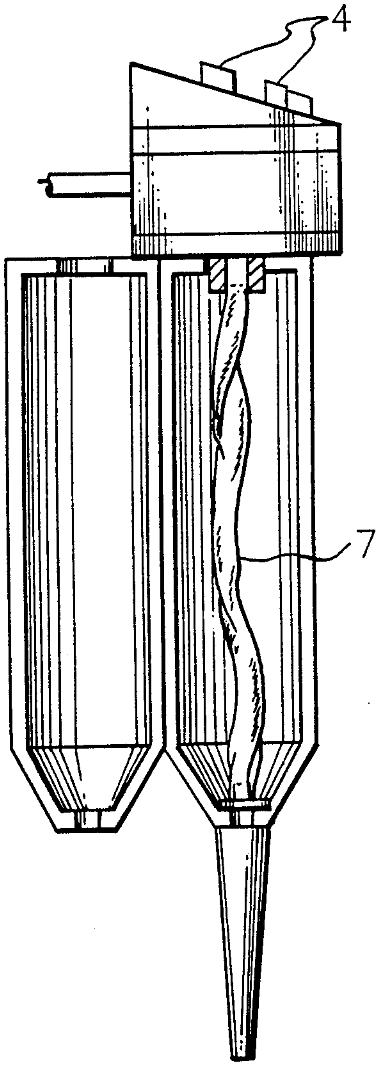
Fig.6.b.

METHOD AND APPARATUS FOR PIPETTING LIQUIDS

The invention relates to methods for pipetting liquids and to a microprocessor assisted apparatus for performing such methods. More particularly, the invention relates to improved pipetting methods which enhance the accuracy of pipetting by minimizing the occurance of unintended dripping.

BACKGROUND

The employment of microprocessors and step motors for automating and controlling the pipetting process has greatly enhanced the convenience of pipetting. In a typical automated pipetting apparatus, the step motor is connected to piston pump. The piston within the piston pump is driven by the step motor. The displacement of the piston within the piston pump is proportional to the number of steps executed by the step motor. When the piston pump is pneumatically connected to a pipette, displacements of the piston can be employed to aspirate and express liquids therefrom. To a first approximation, the volume of liquid which is aspirated or expressed into or out of the pipette is directly proportional to the displacement of the piston and to the number of steps executed by the step motor.

However, the relationship between the volume of liquid which is aspirated or expressed is not strictly equal to the displacement of the piston and to the number of steps executed by the step motor. Inequality arises from the expansion of the air within the pipette due to weight of the liquid column within the pipette and the resultant reduction of air pressure therein. Mezei et al (U.S. Pat. No. 4,586,546) discloses the use of a microprocessor within a pipetting apparatus to compensate for the inequality caused by the reduction of air pressure within the pipette due to the weight of the liquid column.

Accuracy and precision were further improved by the introduction of a back sip function (e.g., IQ 190 DS Sample Processor, manufactured by Cavro Scientific Instruments Inc., Sunnyvale, Calif.). A back sip is executed after the expression of liquid from the pipette and causes liquid to withdraw into the pipette. After the execution of each piston stroke for expressing fluid, the microprocessor instructs the step motor to reverse direction and to displace the piston over a small volume in the opposite direction. This causes liquid to withdraw into the pipette. Hence, the back sip function reduces the occurance of unintended dripping from the pipette. Methods for programming a computer for executing a back sip funcion are described in the publication entitled Cavro RS232C Primitive Protocol Manual (August, 1984, P/N 015-5864 Rev. B, Cavro Scientific Instruments, Inc., Sunnyvale, Calif.).

Unfortunately, under some circumstances, the prior art back sip function does not reduce unintended dripping to the degree that would be anticipated. Furthermore, under other circumstances, the prior art back sip function effectively prevents unintended dripping but degrades the accuracy and precision of pipetting due to other factors. The prior art back sip is optimized by determining the best compromise for the piston displacement which performs a fixed back sip function, i.e. what single magnitude of piston displacement most effectively reduces unintended dripping and best improves the accuracy and precision of the pipetting process both when the pipette is near full and when it is near empty. The optimal piston displacement for the prior art back sip depends upon the gearing of the step motor, the diameter of the piston, and upon the configuration of the pipette. The magnitude of the optimal piston displacement is then converted to the number of step counts which correspond to such displacement. The step count is then executed by the step motor so as to cause the same optimal piston displacement for each back sip.

What was needed was both a recognition of the specific factors and causes of the poor performance of the prior art back sip function and a remedy for this problem.

SUMMARY OF THE INVENTION

The invention for the improved method and apparatus for pipetting liquids recognizes several factors and causes for the poor performance of the back sip function of the prior art. Furthermore, invention for the improved method and apparatus for pipetting liquids provides several remedies for this poor performance.

It is experimentally observed that, after expressing the first aliquot of multiple aliquots from a loaded pipette, the magnitude of the back sip may be too little. Hence, under this circumstance, the lower miniscus of the liquid column will rise too little. In fact, if a droplet remains pending from the pipette tip after the expression of liquid, the back sip may not retract the droplet all the way into the pipette, i.e. a portion of the droplet may remain pending from the tip of the pipette. Hence, under this circumstance, the risk of unintended dripping is insufficiently reduced.

On the other hand, it is also experimentally observed that, when expressing the penultimate aliquot of multiple aliquots from a pipette, i.e. when very little mass remains within the liquid column, the magnitude of the back sip is some-times too great. Under this circumstance, there is a risk that the lower miniscus of the liquid column may rise into the tip of the pipette, through the narrow bore region of the tip and into the main body of the pipette. If the main body of the pipette has a relatively wide bore, the introduction of air into this region, may cause the formation of a bubble. If a bubble forms and rises through the liquid column, the microprocessor will loss track of the true location of the lower miniscus. Hence when the next aliquot is expressed from the pipette, its volume will be inaccurate. The error of the volume of this last aliquot will correspond approximately to the volume of the air bubble.

The invention for an improved method and apparatus for pipetting also provides a novel remedy for these problems, viz. a back sip function which is adjustable with respect to each aliquot of multiple aliquots. The back sip function is adjustable with respect to both magnitude and speed of execution. Furthermore, the back sip function is adjustable with respect to the delay between its execution and the execution of the preceding expression step. Furthermore, it is recognized that the speed of execution of the preceding expression step will effect the back sip step. Furthermore, an optimal schedule for the back sip function must be determined for each different type of pipette which is anticipated to be employed with the apparatus, because the effects of size and shape of the pipette and because the effects of surface interactions between the pipette and the liquid will influence the schedule. And finally, since the viscosity, surface tension, and other physical properties of the liquid will effect the back sip schedule, a different schedule needs to be determined for each type of liquid with which the pipetting apparatus will be used. Fortunately, the optimal back sip schedule for most weak aqueous solutions can approximated by water.

The back sip schedule consists of the optimal back sip parameters as a function of the volume of liquid within the pipette. In turn, the liquid volume is correlated with the step count of the step motor. Each step count displaces the piston a constant volume and corresponds to an incremental increase or decrease of liquid within the pipette. Hence the optimal back sip parameters need only be determined for a countable number of step counts. In fact, interpolation may be employed to reduce the number of points for which optimal parameters need to be measured. Of all of these back sip parameters, the parameter having the greatest effect upon the improvement of the accuracy and precision of pipetting is the magnitude of displacement.

Furthermore, it has been found most expeditious to determine the optimal parameters for the back sip function empirically, i.e. by measurement. Once these parameters are determined they can be loaded into the memory of a microprocessor.

The invention further recognizes the need for a preliminary back sip. A preliminary back sip occurs after aspirating liquid into the pipette, but prior to the expression of the first aliquot. Since the preliminary back sip follows an aspiration step, it is not a true "back sip," i.e. the direction of the piston is not reversed. However, the preliminary back sip function shares at least one important similarity with the regular back sip, viz. both functions minimize the risk of dripping.

And finally, the invention further recognizes the need for a blow out volume of air for clearing out the pipette of residual liquid after the expression of the last aliquot. For best accuracy, a small volume of liquid should remain in the pipette after the expression of the last aliquot. However, prior to aspirating new liquid into the pipette for further pipetting, the entirety of the remaining small volume of liquid needs to be discharged from the pipette, i.e. the pipette needs to be cleared of all residual liquid. Hence, the improved method first aspirates a "blow out" volume of air into the pipette prior to the first aspiration of liquid. At the conclusion of the expression of the last aliquot, this blow out volume of air remains within the pipette and is employed for blowing out any residual liquid.

In the preferred mode, the improved method for pipetting liquids is performed by means of the improve apparatus for pipetting liquids. The improved apparatus shares many similarities with prior art pipetting apparatus which employ a piston pump, step motor, and microprocessor. However, a principal difference between the improved apparatus and the prior art apparatus is the content of the memory of the microprocessor, i.e. the memory of the microprocessor includes a corelation or schedule which provides the step count which yields the optimal parameters for the back sip function as a function of the height of the liquid column which remains in the pipette. Additionally, the microprocessor of the improved apparatus includes the means to execute the adjustable back sip function.

Furthermore, the improved pipetting apparatus includes the option of employing a variety of pipettes. In addition to the standard serological pipette, the improve apparatus can employ a multichannel pipette and a bag type pipette. Each channel within a multichannel pipette may be pneumatically attached to its own piston pump. All of the multiple piston pumps may then be driven by a single step motor.

The bag type pipette includes a bag suspended within a pneumatic chamber. A tip portion is connected to the bag and projects out of the chamber. The pneumatic chamber is pneumatically connected to a piston pump which is then driven by a step motor. In use, the tip of the pipette is submerged into a source of liquid and air is drawn from the pneumatic chamber. As air is drawn from the pneumatic chamber, liquid is aspirated into the bag. Liquid can then be expressed from the bag by releasing air back into the pneumatic chamber.

BRIEF DESCRIPTION OF THE DRAWINGS

FIG. 6(*a*) and 6(*b*) are plan views of a further alternative embodiment of the pipette and handle illustrating a handle having a pneumatic chamber and illustrating a bag type pipette. FIG. 6(*a*) illustrates a closed pneumatic chamber and FIG. 6(*b*) illustrates an opened pneumatic chamber. The opened pneumatic chamber may be employed to insert or remove the bag type pipette.

DETAILED DESCRIPTION

Figure 1:
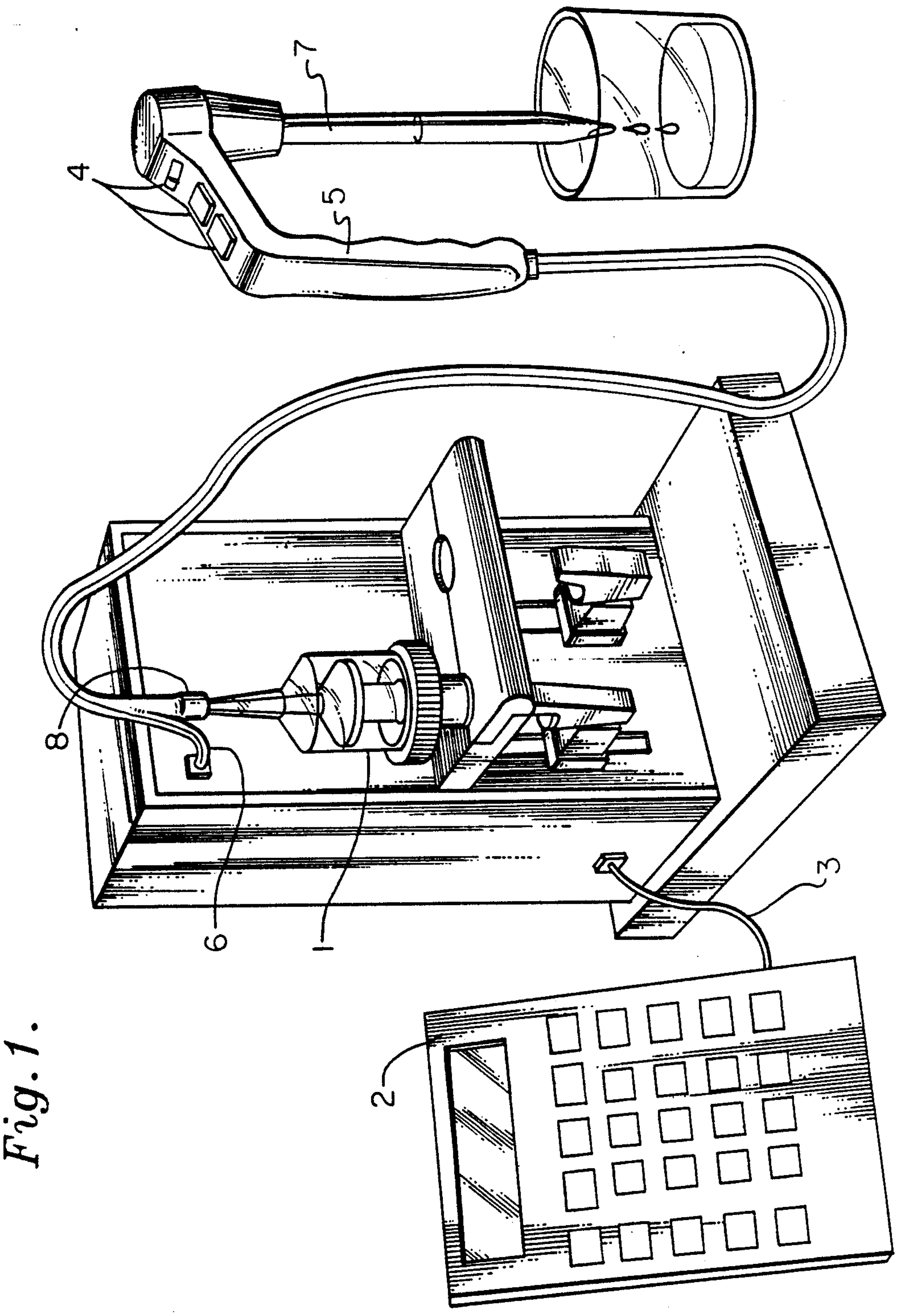
FIG. 1 is a perspective view of the improved pipetting apparatus showing all of the major components joined together, including a handle for a serological pipette.
Figure 2:
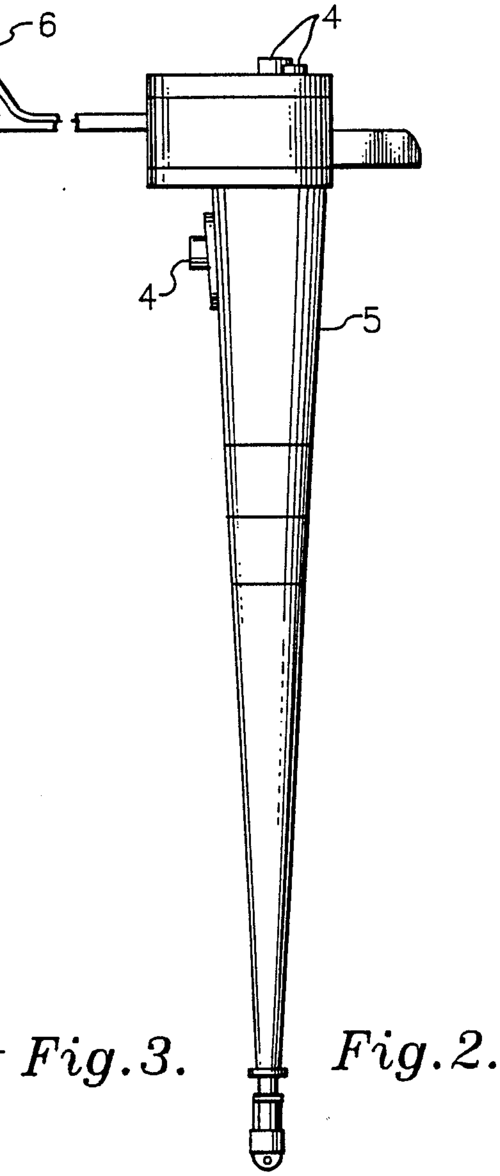
FIG. 2 is a plan view of an alternative handle and micro-pipette which may be substituted for the handle and serological pipette in FIG. 1.
Figure 3:
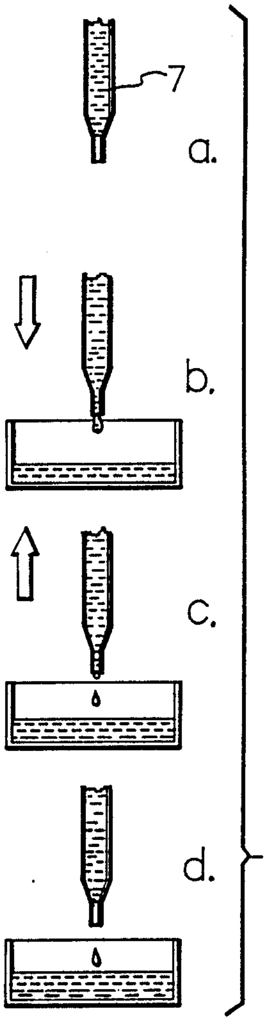
FIG. 3 is a plan view illustrating the serological pipette of FIG. 1 as it is employed in a partial sequence of the improved pipetting method. The sequence illustrates the expression of liquid and subsequent back sipping of the liquid into the pipette.
Figure 4:
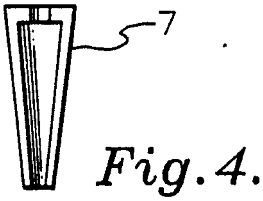
FIG. 4 is a plan view which illustrates a standard conical shaped micro-tip which may be employed as a pipette and which may be inserted onto the end of the handle illustrated in FIG. 2.
Figure 5:
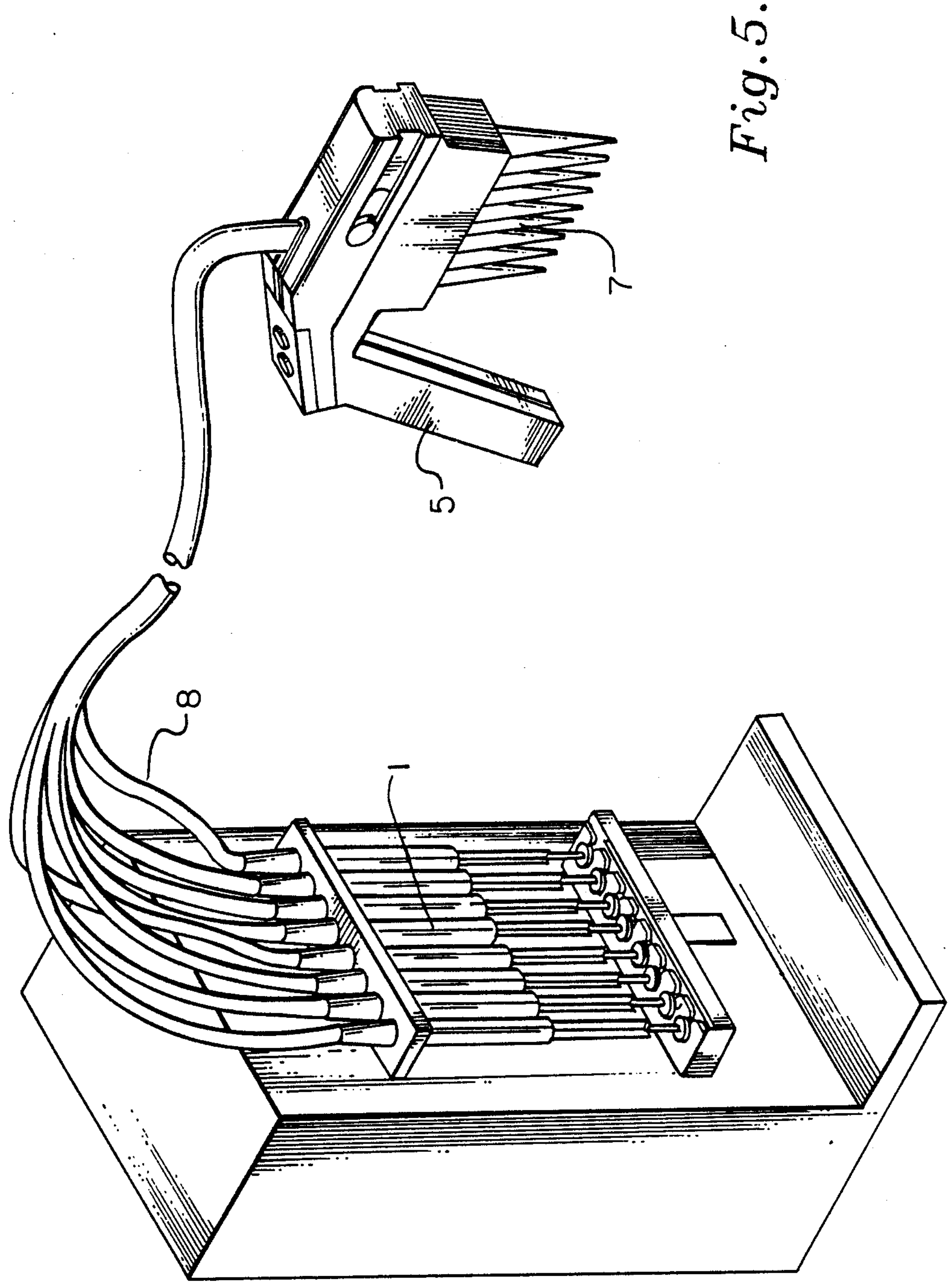
FIG. 5 is a perspective view of a portion of an alternative embodiment of the improved pipetting apparatus illustrating a multichannel pipette, a handle which is adapted to accept the attachement of the multichannel pipette, multiple piston pumps, and multiple pneumatic hoses connecting the multiple piston pumps to the handle.

The pipetting apparatus includes a piston pump (1) and a step motor for driving the piston pump (1). Additionally, a microprocessor is employed for controlling the step motor. Data and programming may be entered into the microprocessor by means of an input box (2). The input box (2) may include a display which requests instructions, echoes the response, and displays the status of the apparatus. A first electronic cable (3) connects the input box (2) with the microprocessor. Furthermore, a set of electronic controls (4) may be incorporated into a pipette handle (5) for initiating various commonly employed functions, including aspiration, expression, and mixing functions. The electronic controls (4) are connected to the microprocessor by means of a second electronic cable (6). The pipette handle (5) may be hand held with the electronic controls (4) conveniently located for operation by the user's fingers or thumb. The pipette handle (5) includes a connector to which a pipette (7) may be attached. A pneumatic hose (8) connects the piston pump (1) with the handle (5) so that displacements by the piston pump (1) displace air within the pneumatic hose (8) and cause liquid to rise and fall within the pipette (7).

In use, a pipette (7) is attached to the handle (5) by means of the connector, the step motor and microprocessor are energized, and the step motor goes through an initialization procedure. During the initialization procedure, the step motor drives the piston pump (1) through its full range and establishes a zero reference point. The range of the piston pump (1) and zero reference point are then recorded within the memory of the microprocessor. The zero reference point is the reference point from which the step motor is driven and from which the step count is measured.

The display on the input box (2) may then prompt the user to enter data with respect to the particular pipette (7) which is to be used and with respect to the liquid volumes which are to be aspirated and expressed or dispensed. Alternatively, the user may enter a new program into the microprocessor or may enter other data into the memory of the microprocessor relating to the viscosity, temperature, and other information. After the microprocessor has been instructed, the electronic controls (4) on the handle (5) can then be employed to initiate the pipetting process.

Typically, a user will wish to aspirate liquid into the pipette (7) and then express one or more aliquots. In this case, the user may employ the electronic controls (4) to instruct the microprocessor to drive the step motor so as to aspirate a specified volume of liquid into the pipette (7) and then to express aliquots of liquid in specified volumes. The aliquots may be identical or may differ in size.

In a preferred mode, the memory of the microprocessor includes a correlation which relates the aspirating step count by which the step motor is drive with the precise volume of liquid which is aspirated into the pipette (7). This correlation may vary from one pipette to the next and from one liquid to the next. Accordingly, the memory of the microprocessor may include data for this correlation for each pipette and liquid which may be employed with the apparatus.

It has been found to be easiest to determine these correlations empirically. Hence, for a given pipette and liquid, the volume of the aspirated liquid is determined over the complete range of step counts through which the piston pump (1) may be driven. Typically, water is the most important liquid for which aspiration correlations are obtained. The aspiration correlations for other dilute aqueous solutions will approximate the aspiration correlation for water. Hence, the standard memory may include an aspiration correlation for water only. However, if a user has a need for pipetting other liquids having viscosities and other properties which significantly differ from that of water, aspiration correlations for these liquids may also be empirically obtained and entered into the memory of the microprocessor.

In a preferred mode, prior the actual aspiration of liquid into the pipette (7), the microprocessor causes the step motor to drive the piston pump (1) so as to aspirate a blow out volume of air into the pipette (7). The blow out volume of air is drawn into the pipette (7) prior to the submersion of the pipette (7) tip into a source of liquid., The blow out volume of air is employed during the dispensing portion of the pipetting method in order to blow out residual liquid remaining within the pipette (7) after the all of the various aliquots have been expressed therefrom. The blow out volume of air allows the piston pump (1) to blow out the last portion of liquid from the pipette (7). Without the blow out volume of air, residual liquid may remain within the pipette (7) due to expansion within the pipette (7) caused by heat expansion, degassing, liquid adherence to the inner wall surface of the pipette (7), or other reasons Without the aspiration of a blow out volume of air into the pipette (7), the piston pump (1) would be unable to blow out residual liquid from the pipette (7) once step motor had reached the zero reference step. Hence, the blow out volume of air is an extra volume of air, which is drawn into the pipette (7) prior to the aspiration of liquid and which allows the piston pump (1) to blow residual liquid from the pipette (7) after the completion of the pipetting process.

In order to aspirate liquid into a pipette (7), the data is first entered into the microprocessor with respect to the pipette (7) into which the liquid will be aspirated and the the volume of liquid to be aspirated is then specified. After this data has been entered into the microprocessor, the tip of the pipette (7) is submerged into a source of the liquid. The aspiration control on the handle (5) is then activated and the microprocessor employs its aspiration correlation in order to determine how many step counts to send to the step motor. The appropriate number of step counts are then sent to the motor. The step motor executes the appropriate number of step counts, thereby driving the piston pump (1) and cause liquid to be drawn into the pipette (7).

Once the liquid is drawn into the pipette (7), the tip of the pipette (7) is withdrawn from the liquid source. If the tip of the pipette (7) was significantly submerged within the liquid source, its withdrawal will cause a small loss of pressure within the pneumatic hose (8). This may result in the formation of a small droplet of liquid. hanging from the tip of the pipette (7). If the pipette (7) were then vertically accelerated sharply, such acceleration could cause the droplet to separate and fall from the pipette (7). The precise volume of liquid within the pipette (7) would then become unknown. Precise pipetting would then become impossible.

Accordingly, in the preferred mode, the microprocessor may be programmed to back sip the liquid into the pipette (7) subsequent to the aspiration of liquid. The back sip occurs after the tip of the pipette (7) is withdrawn from the source of liquid. A back sip causes liquid to be partially withdrawn into the pipette (7). If a droplet of liquid is pending from the tip of the pipette (7) of if the liquid protrudes in a convex fashion from the tip of the pipette (7), a back sip after the aspiration step will cause the droplet or convex bulge to be withdrawn into the pipette (7). If the tip of the pipette (7) is elongated and includes a narrow bore, then the back sip may cause air to enter into the tip. Alternatively, the back sip may merely reduce the convexity of the droplet or may cause the liquid air interface to become concave instead of convex.

In any event, when back sipping liquid into the pipette (7), it is critical to back sip only within an allowable range. A back sip which is too small will not sufficiently draw the liquid into the tip of the pipette (7) to prevent it from being shaken off during an unintended vertical jolt. On the other hand, a back sip which is too great, may cause bubbling within the pipette (7). Bubbling will occur if air is drawn too far into the pipette (7). If the tip has a wide bore, bubbling will readily occur if the liquid is drawn into the region of the wide bore; but if the tip has a narrow bore, bubbling will not readily occur so long as the liquid is not withdrawn beyond this narrow bore.

The optimal magnitude of the back sip will depend upon the size and shape of the pipette (7), upon the volume of liquid which is aspirated into the pipette (7), and upon the nature of the liquid which is aspirated, i.e. its viscosity, surface tension, its attraction to the surface material of the pipette (7), and other factors. The optimal magnitude of the back sip is most easily determined empirically. Hence, the memory of the microprocessor is loaded with a back sip coorelation which relates the optimal back sip to each of these factors.

After the liquid is aspirated into the pipette (7) and, if desired, after the back sip has occurred, the aliquots of the liquid may be expressed from the pipette (7). Once again, the volume of the aliquot which is expressed from the pipette (7) should be empirically correlated with the step count of the step motor. This correlation will depend upon both the pipette (7) and the liquid which is being expressed. The correlation will also depend upon the speed with which the step count is executed.

During the expression process, the liquid within the pipette (7) will behave similar to a mass on a damped spring. The liquid is the mass; the compressed air is the spring; and the resistance to fluid flow through the tip of the pipette (7) is the damping. If the damping is low, i.e., if the resistance to fluid flow through the tip of the pipette (7) is low, the system may be under-damped. Under such circumstances, if the step count is executed quickly, the liquid within the pipette (7) may over shoot the desired volume. Over shooting the desired volume may be prevented by increasing the resistance to fluid flow at the tip of the pipette (7), by slowing the execution of the step count, and by executing a back sip at the precise moment that the desired volume of liquid has been expressed from the pipette (7).

Hence, the back sip subsequent to the first expression step, will depend not only on the pipette (7), the volume of aspirated liquid, and the nature of the aspirated liquid, but will also depend upon the volume of expresses liquid and upon the velocity of the liquid column within the pipette (7) at the moment of the back sip. Once again, the velocity of the liquid column, is dependent upon the speed with which the step count was executed for the expression step, upon the mass of the liquid column, and the resistance to fluid flow at the tip, viz. its bore size.

Accordingly, when determining the empirical correlation between the volume of expressed liquid and the step count for the back sip, all of these factors should be taken into account. Fortunately, these factors are reducable to the size and shape of the particular pipette, the physical properties of the liquid, and the number and speed of the aspiration step and the expression step.

Additionally, the speed of execution of the step count for the back sip and the delay between the execution of the step count for the expression step and the step count for back sip step may be adjusted. For large masses, the speed of execution of the step count for the back sip may be quite fast and the delay may be rather long. However, for smaller masses, the speed of execution of the step count for the back sip may be somewhat slower and the delay may be rather short. In the finally analysis, however, it is easiest to empirically determine the optimal correlation between the optimal step count, speed, and delay of the back sip.

What is claimed is:

1. In an improved method for expressing multiple aliquots of liquid from a pipette, the method including the following steps:

Step A: submerging the tip of the pipette into a source of the liquid; then

Step B: loading the pipette with an initial volume of liquid by means of a piston pump driven by an electric motor, the piston pump being pneumatically connected to the pipette, the initial volume of liquid including both an aliquot and a retained volume; then Step C: removing the tip of the pipette from the source of the liquid; then Step D: expressing a first aliquot of liquid from the pipette by means of the piston pump; then Step E: backsipping the liquid into the pipette by means of a first backsip stroke of a piston pump; then Step F: expressing a subsequent aliquot of liquid from the pipette by means of the piston pump; and then Step G: backsipping the liquid into the pipette by means of a subsequent backsip stroke;

the improvement wherein:

in said Step E, the first backsip stroke having a magnitude for maintaining the backsipping within an allowable range which substantially reduces the risks of both unintendedly dripping liquid from the pipette and of bubbling air within the pipette; and in said Step G, the subsequent backsip stroke having a magnitude for maintaining the backsipping within an allowable range which substantially reduces the risks of both unintendedly dripping liquid from the pipette and of bubbling air within the pipette;

the magnitude of the first backsip stroke being greater than the magnitude of the subsequent backsip stroke.

2. In an improved method for expressing multiple aliquots of liquid from a pipette as described in claim 1, the improvement being further characterized by:

the first and subsequent backsip strokes differing from one anther with respect to speed.

3. In an improved method for expressing multiple aliquots of liquid from a pipette as described in claim 1, the method further characterized as follows:

in said Step D, the expressing occurring by means of a first expression stoke by a piston pump;

in said Step F, the expressing occurring by means of a subsequent expression stoke;

the improvement being further characterized as follows:

in said Step E, the first backsip stroke following a first delay period after the first expression stroke; and in said Step E, the subsequent backsip stroke following a subsequent delay period after the subsequent expression stroke;

the first delay period differing from the subsequent delay period.

4. In an improved method for expressing multiple aliquots of liquid from a pipette as described in claim 3, the improvement being further characterized by:

the first and subsequent backsip strokes differing from one another with respect to speed.

5. In an improved method for expressing multiple aliquots of liquid from a pipette, the method including the following steps:

Step A: submerging the tip of the pipette into a source of the liquid; then

Step B: loading the pipette with an initial volume of liquid by means of a piston pump driven by a step motor, the piston pump being pneumatically connected to the pipette, the initial volume of liquid including both an aliquot and a retained volume; then Step C: removing the tip of the pipette from the source of the liquid; then Step D: expressing a first aliquot of liquid from the pipette by means of the piston pump; then Step E: backsipping the liquid into the pipette by means of a first backsip stroke of the piston pump; then Step F: expressing a subsequent aliquot of liquid from the pipette by means of the piston pump; and then Step G: backsipping the liquid into the pipette by means of a subsequent backsip stroke;

the improvement comprising the following additional steps:

Step A′: prior to said Step A, aspirating a blow out volume of air into the pipette;

Step C′: after said Step C and prior to said Step D, executing a preliminary backsip of the liquid into the pipette by means of a preliminary backsip stroke of the piston pump;

in said Step E, the first backsip stroke having a magnitude for maintaining the backsipping within an allowable range which substantially reduces the risks of both unintendedly dripping liquid from the pipette and of bubbling air within the pipette; and Step E(1): prior to said Step E, determining a step count required by the step motor for performing the first backsip stroke;

in said Step E, backsipping the liquid into the pipette by driving the step motor according to the step count of said Step E(1);

in said step G, the subsequent backsip stroke having a magnitude for maintaining the backsipping within an allowable range which substantially reduces the risks of both unintendedly dripping liquid from the pipette and of bubbling air within the pipette;

Step G(1): prior to said Step G, determining a step count required by the step motor for performing the subsequent backsip stroke;

in said Step G, backsipping the liquid into the pipette by driving the step motor according to the step count of said Step G(1);

the magnitude of the first backsip stroke being greater than the magnitude of the subsequent backsip stroke.

* * * * *